United States Patent
Iglesias

(10) Patent No.: US 7,437,708 B2
(45) Date of Patent: Oct. 14, 2008

(54) ENHANCED SOFTWARE COMPONENTS

(75) Inventor: Lino Iglesias, Caracas (VE)

(73) Assignee: Smartmatic International Corporation, Boca Raton, FL (US)

(*) Notice: Subject to any disclaimer, the term of this patent is extended or adjusted under 35 U.S.C. 154(b) by 360 days.

(21) Appl. No.: 10/906,115

(22) Filed: Feb. 3, 2005

(65) Prior Publication Data

US 2005/0108683 A1 May 19, 2005

Related U.S. Application Data

(63) Continuation of application No. 09/682,064, filed on Jul. 16, 2001, now abandoned.

(51) Int. Cl.
*G06F 9/44* (2006.01)
(52) U.S. Cl. .............. 717/104; 717/107; 717/108; 717/120
(58) Field of Classification Search ............. 717/104, 717/107, 108, 120; 707/3, 100, 2; 382/305
See application file for complete search history.

(56) References Cited

U.S. PATENT DOCUMENTS

| | | | | |
|---|---|---|---|---|
| 5,305,389 A | * | 4/1994 | Palmer | 707/102 |
| 5,832,498 A | * | 11/1998 | Exertier | 707/103 R |
| 5,940,820 A | * | 8/1999 | Kagiwada | 707/3 |
| 5,950,001 A | * | 9/1999 | Hamilton et al. | 717/107 |
| 6,070,006 A | * | 5/2000 | Iriuchijima et al. | 717/108 |
| 6,230,309 B1 | * | 5/2001 | Turner et al. | 717/107 |
| 6,256,780 B1 | * | 7/2001 | Williams et al. | 717/107 |
| 6,421,690 B1 | * | 7/2002 | Kirk, III | 707/206 |
| 6,480,856 B1 | * | 11/2002 | McDonald et al. | 717/108 |

OTHER PUBLICATIONS

Schappert, et al. "Automated Support for Software Development with Frameworks", 1995, ACM, p. 123-127.*

* cited by examiner

*Primary Examiner*—Wei Y. Zhen
*Assistant Examiner*—Qamrun Nahar
(74) *Attorney, Agent, or Firm*—Jeffrey Furr; Furr Law Firm

(57) ABSTRACT

The invention is a software structure for software components that adds greater flexibility to them. This structure is composed of the following parts: On Memory, Structure, On File Structure and On Memory On File Interface. These three parts are united into the same execution environment like a whole, performing functions like the older components but more complex than the older ones.

6 Claims, 4 Drawing Sheets

-Prior Art-

ENHANCED SOFTWARE COMPONENTS

FIELD OF INVENTION

The present invention relates to the field of software components. Still more particularly, the present invention proposes a new development approach to software components.

DISCUSSION OF PRIOR ART

Object has been a revolutionary way to make software. It has changed the paradigm of software module development into an easier way of develop and design software. It has changed concepts like linear programming, modular programming, cohesion and coupling, into concepts like encapsulation, polymorphism, abstraction y inheritance. Objects are conformed by methods and properties (and into a event driven environment, Events) where properties specifies object state and methods transformations over those properties i.e. over the object state. Each objects is instantiated by a class. The class contains all needed definitions (methods, properties, events) in order to instantiate an object). Classes can be constructed of another classes or inherit directly their properties and methods, and it can add more or override (polymorphism) them. All object oriented programming languages like Java, Smalltalk, C++ has implemented and supported these concepts.

The use of objects has becoming a common practice in software development, and today is the most used software paradigm. After some time of object oriented programming evolution, new needs appeared in the software development ground, needs like distributed execution of objects over a network, standards for classes interfaces, multiple interfaces for an object, transactional and queuing services, and the possibility of put classes instead of another of the same functionality and different implementation without recompile any part of the system, in order to exchange software classes or parts of it easily with software development workgroups, or buy this software to third party developers and put it into the system without any problem. All this needs converged in the same point, different component models that fulfill all the development requirements that exists in that moment.

A Software Component Model is a Software Services infrastructure and standards that maintains software classes generally in a network distribute environment. Examples of component models are CORBA, Enterprise JavaBeans, COM, COM+. These software classes coded in a very specific way attending to certain standards are called software components. Each software component perform a very specific task, and it can have a graphic interface or not. Examples of software components are, mail clients classes, socket abstraction layers, interface controls, business logic classes (of any kind of context, it would be classes like Report, User, Customer, Session, Customer Order, Document, etc). The software components must have a public interface that exposes certain functionality to the external world in order to be used for other components or Interfaces. Software Components have many advantages that are specific of a Component model, but generally in all cases of Software Component Models the advantages are the same. Each Software Component is a class into an software component container (.java or .dll files) or it can be intended like the whole container of classes. The software component infrastructure is based almost totally over Object Oriented Programming because the components actually are composed of classes. This Object Oriented Programming has disadvantages that make the Software Component Model Weak in some areas. The theoretical basis of an object only can allow a set of properties and methods, and those are loaded into memory completely. An object isn't able to support any other type of media in its structure, making hard to model complex scenarios with few objects. There is the need to add to the different Component Models additional structure that provides support for complex objects, or gives versatility to the existing ones.

SUMMARY OF INVENTION

The present invention is a software structure for software components that adds greater flexibility to them. This structure is composed of the following parts:.cndot.On Memory Structure.cndot.On File Structore.cndot.On Memory On File Interface. These three parts are united into the same execution environment like a whole, performing functions like the older components but more complex than the older ones. The inner structure of an ESC (Enhanced Software Component) is a three tier model that contains a piece of it always loaded in memory (On Memory Structure), the other (On File Structure)is loaded into pieces by a File Component Loader, and it works loading the pertinent data of the file extension. The On memory Structure and the On File Structure are communicated by an inner interface object (On Memory On File Interface) that provides a interface between the essential parts of an Enhanced Software Component establishing a two ways communication channel. This Interface is a common one for all ESC and it can be enriched in order to support specialized cases.

OBJECTS AND ADVANTAGES

Accordingly, several objects and advantages of our invention are:

a) Complex modeling Capabilities. The objects under this approach are likely to be used to model really complex problems including artificial intelligence, expert systems, etc.

b) It can use the Component Models existing in this moment in order to be implemented. This approach can be generalized to many different execution platforms of components existing in the software world.

c) Older Classes can be easily translated toward this new approach. Only it's necessary to construct or implement the specific On Memory On File Interface in order to add the new structural part to the classes.

d) Disrupt the lack of ability of conventional objects to include large data structures in order to comprehend more specialized models of reality in business case. It also can be applied to e) Greater flexibility never seen before. The On Memory On File Interface can be changed in order to be updated to new data models, On File data (complex properties) or knowledge bases into the On File Structure.

f) Now with ESC exists a virtually unlimited number of data structures that a object can contains.

g) Mutating components. The methods on the On file Structure can be updated and changed in order to achieve different specific behavior of a component accomplishing a task. This results in an extremely dynamic component.

h) All Complex Management is transparent to the programmer, only a few methods of the On Memory On File are exposed in order to make the component more manageable.

LIST OF REFERENCE NUMBERS

Figure 1:
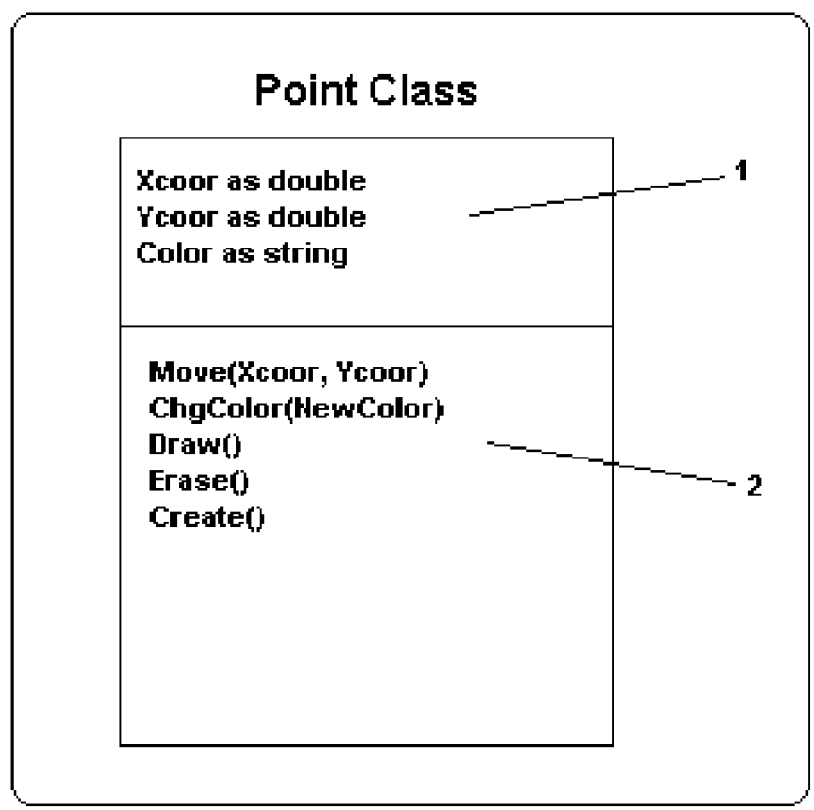
FIG. 1 Example of a ordinary class.
Figure 2:
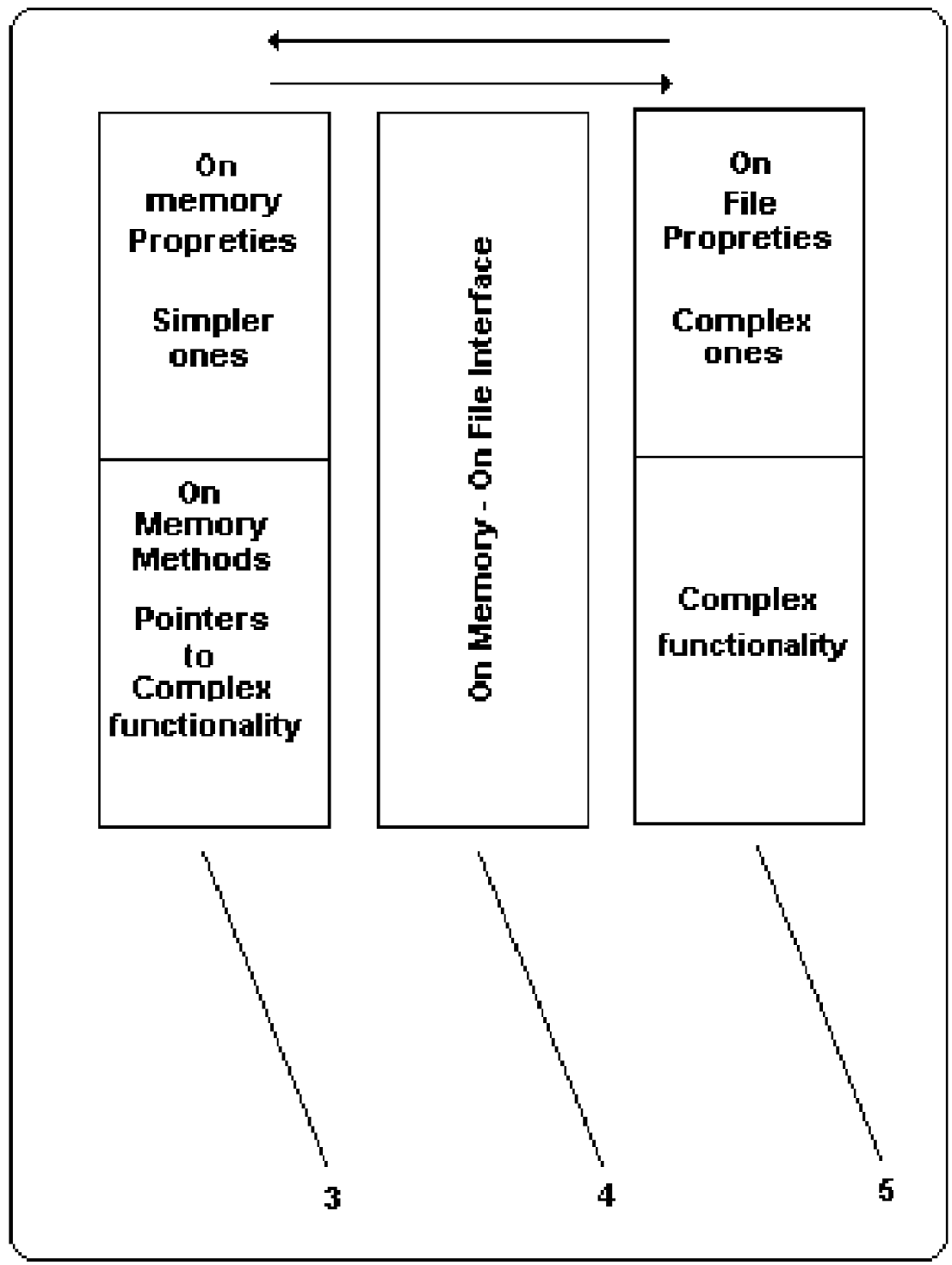
FIG. 2 Structure of a ESC (Enhanced Software Component).
Figure 3:
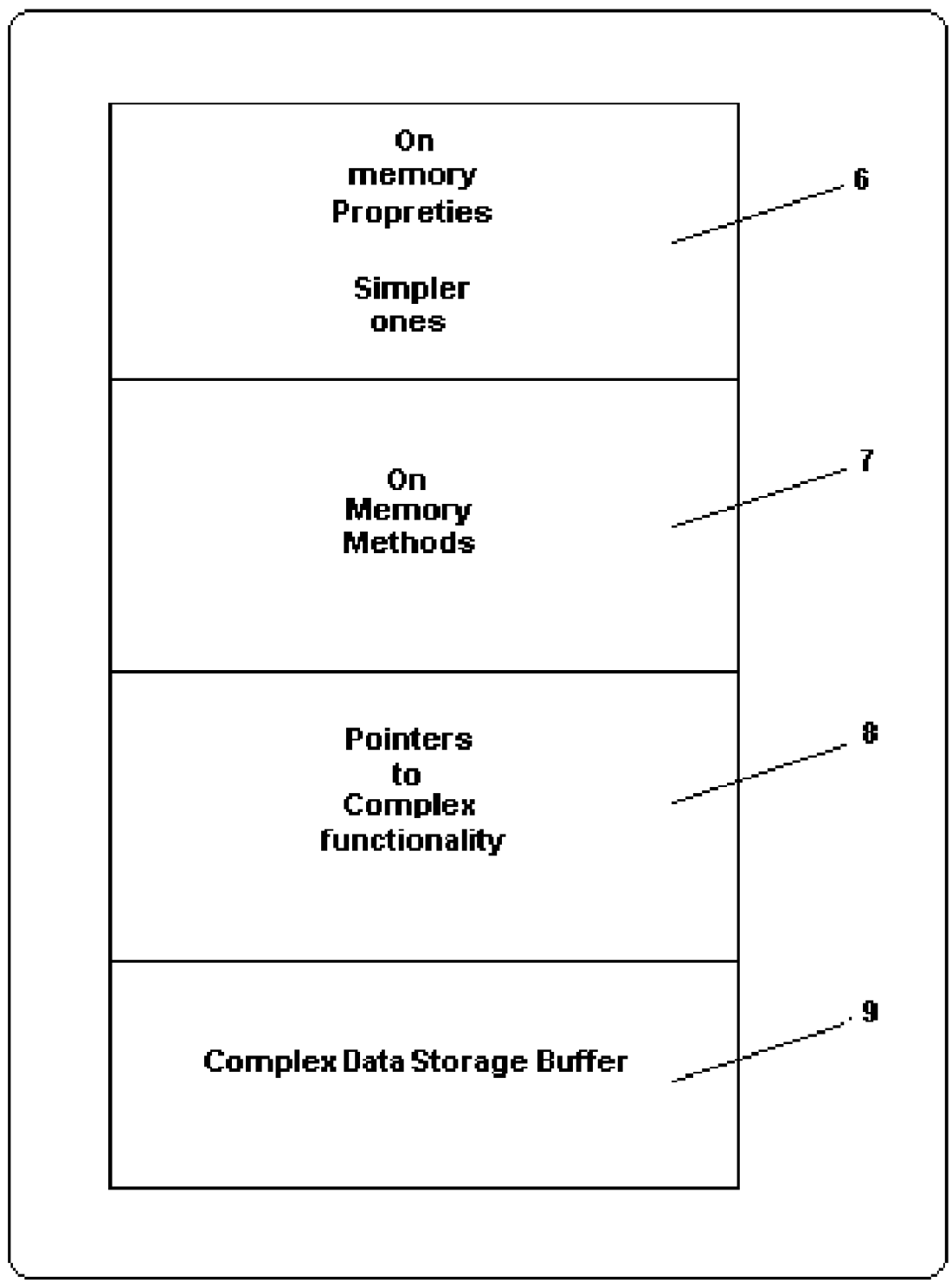
FIG. 3 Structure of On Memory and On File Structures.
Figure 4:
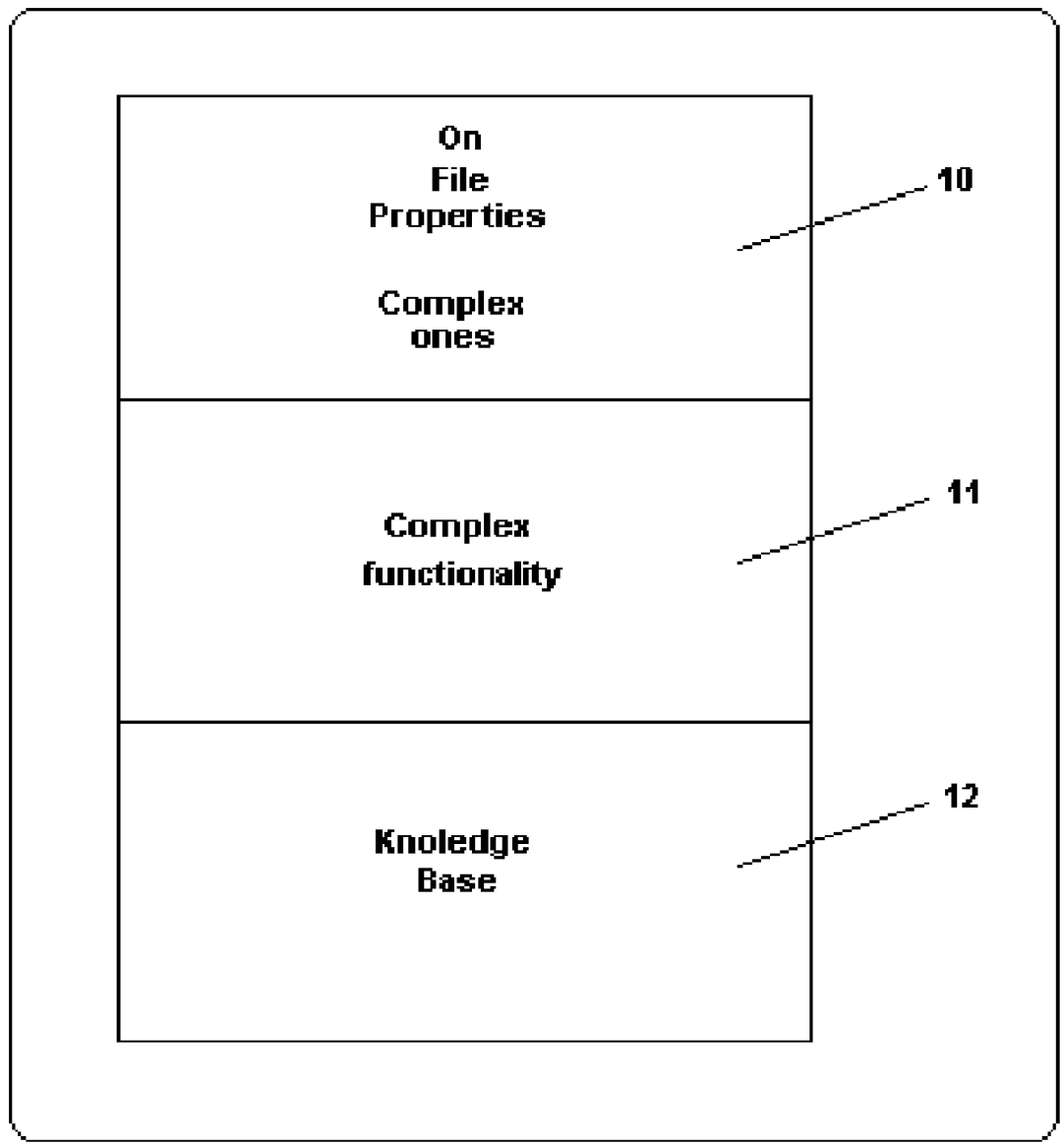
FIG. 4 Structure of On Memory On File Interface.

1.—List of Properties.
2.—List of Methods.
3.—On Memory Structure.
4.—On Memory On File Interface.
5.—On File Structure.
6.—On Memory Properties. Properties of common objects.
7.—On Memory Methods. Methods of common objects.
8.—Pointers to Complex functionality. Key links to data in On File Structure.
9.—Complex Data Storage Buffer. Buffer zone For complex data and functionality.
10.—On File Properties. Complex Data Types and structures or simple ones.
11.—Complex Functionality. High Processing Load Methods or Conditional\Adaptive Behavior.
12.—Knowledge Base. Accumulated knowledge of the component when the component is set to learn.

DETAILED DESCRIPTION OF INVENTION

Enhanced software components is an approach that take all the advantages of the different Component models and provides a richer way to improve their capabilities. This capabilities provides remarkable improvements over the common components that already exists in the software world. The enhanced software components includes the following concepts in order to understand them:

On Memory Structure: Relates to the normal structure of an object loaded in memory (RAM) enriched with another elements. This structure is conformed by several on line properties that conform a part of the whole set of properties, they establish the state of the complex object along with On File properties; the structure contains on memory methods too, that define transformations over the state of the complex object. The On Memory structure contains several Pointers to complex functionality and a Complex Data Storage Buffer, it is a buffer area where the On File data of any type is loaded in order to be used by the On Memory Structure.

On File Structure: This structure is similar in many ways to On Memory Structure it contains On File Properties that defines part of the state of the complex object, but they have a greater complexity than the On Memory ones. On file Structure Contains complex functionality and a knowledge base in order to learn and mutate behavior.

On Memory On File Interface: This interface works like an abstraction layer between the implementation of the data types and complex functionality and knowledge base and the data that the On Memory Structure sees. It have a Built in interface that provides standard access to On File Data through the methods InitComplexRepository( ), GetComplexData( ) and PutComplexData( ). Additionally this built in interface can be enriched by another special methods depending of the required data types and functionality.

Pointers to Complex functionality: This pointer plays an essential role into the management of the complex dimension of the complex object. They points to the various complex functionality functions and procedures Embedded in the On file Structure.

Complex Data Storage Buffer: This buffer holds any kind of data provided by the On Memory On File Interface. It is managed by the interface named before. This data came from the On File Structure, and placed in this place in order to be used by the On Memory structure.

On File Properties: The On File properties deserves a special treatment because it have a greater complexity than the On Memory ones that have common data types. Here data structures like b-trees can be represented and abstracted from the On Memory Structure with the On Memory On File Interface.Complex Functionality: The complex functionality includes all functions and procedures that have a complexity and dynamics greater than the On Memory Ones. Here the functionality can mutate or change in order to adapt to new execution sceneries and inputs or feedback of the system or other components. It is part of the On File Structure.

Knowledge Base: This knowledge base keeps all the acquired knowledge data of the component operation through time. This base can be consulted or enriched through the On Memory On file Interface.

Built In Interface OM-OF: It's the standard interface between the On Memory Structure and the On File Structure. It is composed by the following basic methods:•InitComplexRepository( ): Initialize and get the proper pointers to the data in the repository in order to turn it into the On File Structure of an object.
•GetComplexData( ): Retrieves data from a repository to be used by the On Memory Structure.
•PutComplexData( ): writes data to a repository. (Mutate or change methods, add information to complex knowledge base)•ReleaseComplexRepository( ): Release all memory references, pointers and buffers that belongs to a repository link. That link was established before by the InitCompled Repository( ) function.

Extended Interface OM-OF: This interface is part of the On Memory On file Interface. It is conformed by several specific methods and data structures that provides abstract access to the particular complex data into the On File Structure.

An Enhanced Software Component is basically composed of a On Memory Structure (Provides the programmer interface), a On Memory-On file Interface (the methods of this interface are exposed by the On Memory Structure) and a On File Structure that stores all the complex and large data. The On Memory Structure includes the On Memory-On File Interface in order to manage (disk access, buffering, sorts, etc) the interaction with the On File structure. This On File Structure can be accessed by the standard interface of the custom made extended interface in order to support another special data types and structures. The On File Structure remains in disk and can take many forms (files or groups of files, raw data partitions, etc). When all this parts are united and coupled to function together conform a Enhanced Software Component.

Operation of Invention

A Software Enhanced Component when is instantiated a object is allocated in memory and a copy of the On File Structure is placed in disk, and main records of complex data, complex functionality and knowledge base are placed in the Complex Data Storage Buffer. All complex data is created at instantiation moment and can be modified, only Complex Functionality and Knowledge Base remains in the template file of the On File Structure that belongs to component. When a component is released or erased from memory the method ReleaseComplexRepository( ) gives the option of feed the On File Structure Knowledge Base and Complex Functionality adding the information gained during the object life in memory. All The structures and functionality are exposed through a public interface in the On Memory interface. This interface performs all specific task of the object itself and administrative tasks related to the On File Structure. When a object is used, all structures can be used like memory structures. All memory allocations and swapping will be managed by the object itself.

When a method of an object within a ESC is called the object verify the nature of the call within the function and make all the needed calls in order to access to On File Structures through the On Memory On File Interface. The OM-OF Interface get all structures and manipulates them in order to be loaded into the Complex Data Storage Buffer and be used by the On Memory Structure. The same occurs to the other parts of the ESC (Knowledge Base, Complex Functionality).

The Complex properties works in the same way. When a complex property must be read or wrote, the associated method with the operation (get or let) is ran like another method in the ESC, like a common execution of a common method into the ESC.

Description and Operation of Alternative Embodiments

This type of software component can be used in the development of any type of software: military, commercial, web based, administrative, industrial, etc.

The following are only some clear examples:•An OCR Component to recognize a certain type of character.

A Component of Metadata.

The first one is composed of simple properties like the coordinates of the area that will be recognized. There are complex properties too, like the recognizing pattern to follow (not a pattern descriptor like a number, but the pattern itself in the form of a b-tree). The OCR component contains a knowledge base in order to learn how to recognize certain types of pattern provided by a component training phase. The public interface of the component are functions like Recognize( ) and Training( ). The OM-OF Interface is the built in interface that access the On File Structure in the form of chunks of raw data and a Extended Interface that contains methods like GetPattern( ), WritePattern( ), TrainNeuralNet( ), GetOCR-KnowHow( ), etc. The last functions are called from the implementation of the public interface within the On Memory Structure an its implementation must provide disk data management in order to load in memory the right portions of data when its needed. The recognition algorithm is totally dynamic, it can be changed or mutated in order to improve the results or change the semantics of the recognition. It can be implemented in the complex functionality section on the On File Structure.

In the other hand a metadata component stores a metadata model into its On File Structure in the form of a Complex Property. That metadata model refers to a database model that models a specific situation or micro world in a specific domain. The access methods to the data through the metamodel are made with the Complex Functionality. This approach allows changing the way of retrieve the data or preprocessing it. Further, if the data model in the database is changed, the impact in the component will be minimal, only adjustment is needed in the content of the complex property that contains the metadata model.

Conclusion, Scope and Ramifications

Thus, the reader will see that the present enhanced component paradigm is designed to fulfill requirements of versatility, unlimited number of properties and methods, ability to learn through time, which solves many limitations of existing components. This comprehensive component structure can be used in any software system independently of the objectives of the system itself. While our above description contains many specificities, these should not be construed as limitations to the scope of the invention, but rather as an exemplification of one preferred embodiment thereof.

Obviously, modifications and alterations will occur to others upon a reading and understanding of this specification such as, for example, several possible variations to the presented example structure (OCR) to include other example applications, several variations to the internal implementation of the architecture, especially to different choices to provide intelligence to a specific application. The description above is intended, however, to include all such modifications and alterations insofar as they come within the scope of the appended claims or the equivalents thereof.

What is claimed is:

1. In an object-oriented computer system, a method of generating software components, the method comprising the steps of: Loading a structure of an object to a memory means; Loading a file structure data by a file component loader; Interfacing between the structure of an object and the file structure data by an interface object; interfacing between the structure of an object and the file structure data by an interface object using the methods InitCamplexRepository( ), GetComplexData( ) and PutComplexData( ); having said structure contains a plurality of pointers to complex functionalities and complex data storage buffers; Loading the file structure data by a file component loader which includes complex functionality and a knowledge base; and having said structure contains a plurality of pointers to complex functionalities and complex data storage buffers and said complex data storage buffers includes metadata models where a database model that models a specific situation or micro world in a specific domain.

2. The method of claim 1 further comprising having said structure contains a plurality of pointers to complex functionalities and complex data storage buffers and said complex data storage buffers includes pattern recognition components that use a dynamic algorithm which can be changed dynamically to improve the results or change the semantics of the recognition.

3. In an object-oriented computer system, a device to generate software components comprising of a memory: a loading means for loading a structure of an object in a memory means; a loading means for loading a file structure data by a file component loader; an interface means for interfacing between the structure of an object and the file structure data by an interface object; the interface means between the structure of an object and the file structure data by an interface object using the methods InitComplexRepository( ), GetComplexData( ) and PutComplexData( ); and said structure contains a plurality of pointers to complex functionalities and complex data storage buffers and said complex data storage buffers includes metadata models where a database model that models a specific situation or micro world in a specific domain.

4. The device of claim 3 in which: said structure contains a plurality of pointers to complex functionalitles and complex data storage buffers and said complex data storage buffers includes pattern recognition components that use a dynamic algorithm which can be changed dynamically to improve the results or change the semantics of the recognition.

5. A computer program product for generating software components, the computer program product comprising a computer usable medium having computer readable program code thereon, including: program code for loading a structure of an object in a memory means; program code for loading a file structure data by a file component loader; program code for Interfacing between the structure of an object and the file structure data by an interface object; a base component has interfaces and The program code for: interfacing between the structure of an object and the file structure data by an Interface object using the methods InitComplexRepository( ), GetComplexData( ) and PutComplexData( ); said base component has interfaces and the program code for: having the structure containing a plurality of pointers to complex functionalities and complex data storage buffers; and said structure to contains plurality of pointers to complex functionalities and complex data storage buffers and said complex data storage buffers includes pattern recognition components using a dynamic algorithm which can be changed dynamically to improve the results or change the semantics of the recognition; said structure contains a plurality of pointers to complex functionalities and complex data storage buffers and said complex data storage buffers includes metadata models where a database model that models a specific situation or micro world in a specific domain.

6. The computer program product of claim 5 wherein the base component has interfaces and the program code for: Allocating an object in a memory means; Copying the structure to a memory means; Placing the records of complex data, complex functionality and knowledge base in the Complex Data Storage Buffer; Creating complex data at instantiation moment; Modifying complex data; Deciding whether to write complex data, complex functionality and knowledge base to a memory means; Exposing the structures and functionality through an interface that performs all specific task of the object itself and administrative tasks related to the structure; and Using a object in which all structures can be used like memory structures and all memory allocations and swapping will be managed by the object.

\* \* \* \* \*